Patented Dec. 1, 1936

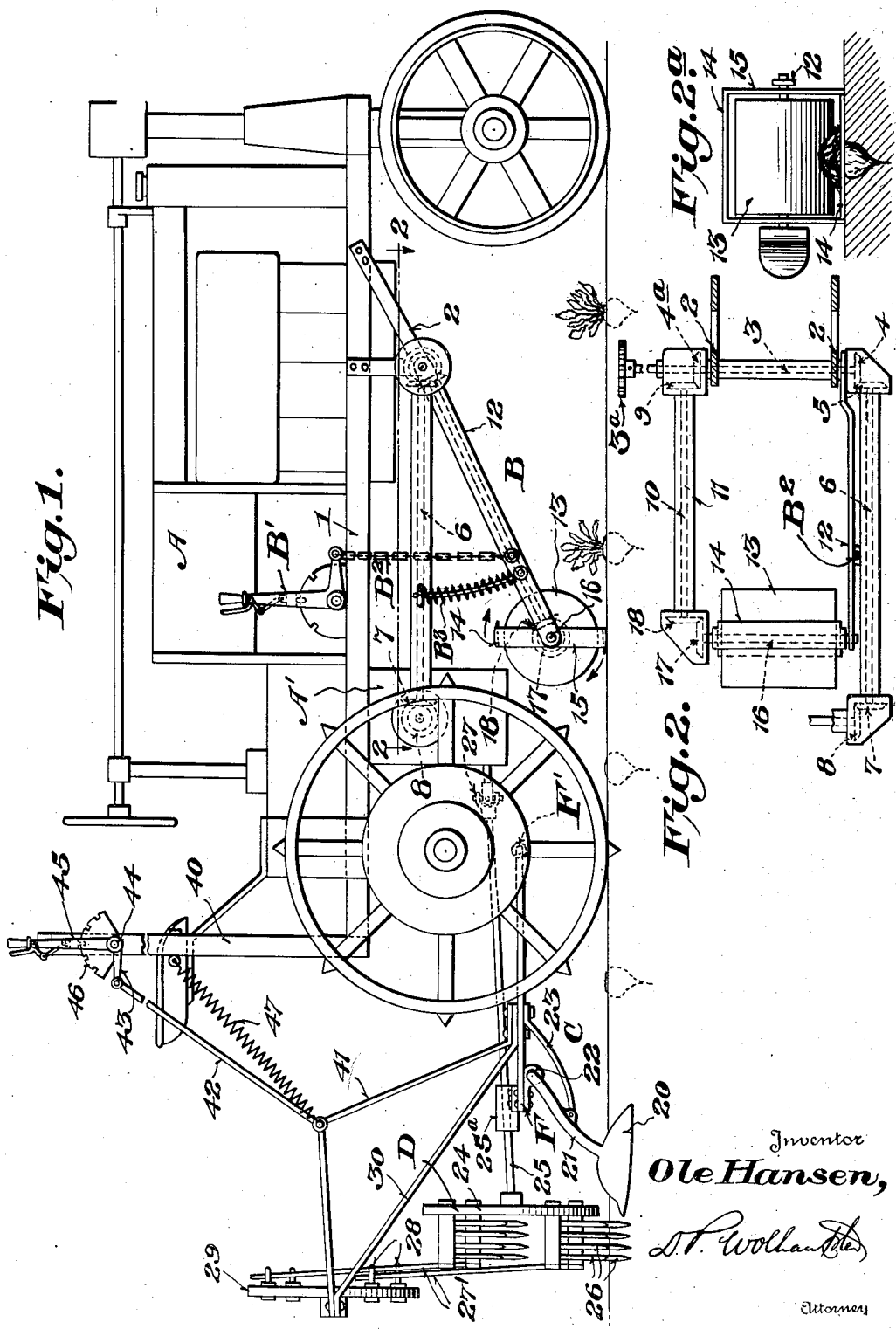

2,062,711

UNITED STATES PATENT OFFICE 2,062,711

BEET HARVESTER

Ole Hansen, Menan, Idaho

Application October 24, 1935, Serial No. 46,616

9 Claims. (Cl. 55—107)

This invention relates to harvesting machines and more particularly to an apparatus for expeditiously effecting the harvesting of sugar beets.

It is doubtless well known that sugar beets have a luxuriant top foliage which is exposed above the ground while the beet itself is imbedded in the earth, and, in preparing beets of this type for the market, it is necessary that these tops be removed. Obviously, removal by hand is a tedious operation, and while various types of apparatus have heretofore been used for this purpose, nevertheless they are open to various objections, such for example as either not properly removing the tops or cutting away too much of the body or pulp of the beet. Also, after the beets are topped, they must be removed from the ground and loaded for transportation from the field.

Accordingly, the present invention has generally in view a harvesting apparatus which not only removes the tops of the beets but also includes a unit which plows or pulls them from the earth and places them in position to be automatically pitched into an elevator or lifting mechanism that carries or conveys them into a field wagon travelling beside the harvester.

One of the special objects of the invention is to provide a novel topping unit which is intended to roll over the exposed tops or foliage for the purpose of depressing or laying it down in preparation for being automatically sheared or cut from the body of the beet in the earth by rotating power driven knives or blades.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawing, in which:—

Figure 1 is a side elevation of the improved harvesting apparatus.

Figure 2 is a horizontal sectional view taken on the line 2—2 of Figure 1.

Figure 2ª is a detail front elevation of the topping unit.

Similar reference characters designate corresponding parts throughout the several figures of the drawing.

According to the embodiment of the invention shown in the accompanying drawing, the same essentially comprises a tractor or equivalent motor vehicle A including a chassis, motor, steering means etc. and having a motor driven transmission designated generally as A' and equipped beneath the chassis or platform thereof with a novel topping unit B operating in advance of a pulling or digging unit C connected to the rear of the vehicle and which precedes the lifting means D intended to pick up beets from the ground and pitch or throw them into a suitable lifting or elevating conveyor device.

Referring first to the topping unit B, it may be pointed out that the same is preferably mounted beneath the frame 1 of the vehicle by suitable brackets 2. These brackets provide a support in which a secondary drive shaft 3 is journalled, the said shaft having at one end thereof a power take-off gear 3ª and at the opposite end a bevelled gear 4 meshing with the bevelled gear 5. This gear is carried by shaft 6 which shaft extends rearwardly of the vehicle and is provided with a gear 7 meshing with the main power driven gear 8 of the power driven transmission A' previously referred to. Thus, it will be apparent that the shaft 3 is directly driven from the transmission of the vehicle for the purpose of supplying power to the cutting elements of the topping means proper as will presently appear. The shaft 3 is provided, in addition to the gear 4 with another bevelled gear 4ª which in turn meshes with a bevelled gear 9 carried by the downwardly extending shaft 10 encased within a housing 11. The upper end of this housing is rotatively mounted on the shaft 3 so that the housing as well as the shaft may swing relative to the shaft 3. An arm 12 is also rotatively mounted on the shaft 3 between the gear 4 and one of the brackets 2 as will be apparent from Figure 2. Thus, the casing 11 and arm 12 provide in effect a swinging hanger for a top depressing drum 13 and a plurality of rotating cutting blades 14. The cutting blades 14 are carried by a frame or reel portion 15 mounted on the shaft 16 journalled in the lower end of the housing 11 and the lower end of the arm 12. This shaft 16 has the top depressing drum idly mounted thereon but is provided with a gear 17 which in turn meshes with a gear 18 on the shaft 10 in the housing 11. Since the frame or reel 15 is keyed or locked with the shaft 16, it will be apparent that the cutting blades 14 carried by the reel 15 will be power driven direct from the transmission of the vehicle through the medium of the shafting 6—3—10 and the gears described. Thus, the cutting blades or shears are power driven and rotate about the drum 13 which passes over the beet tops to depress the same.

The top depressing drum 13 is preferably an inflated member made of rubber or equivalent material, thereby to provide in effect a compressible or cushioned drum which will yieldingly depress the standing tops of the beets so as to lay them down and enable the rotating knives 14 to readily and effectively sever the foliage from the body of the beet.

The entire topping unit may be raised and lowered through the medium of the lever B' and the flexible link or chain B². That is to say, for the purpose of regulating the portion of the drum 13 and knives 14 with reference to the ground or the beet tops, the entire unit may be raised and lowered by the means B' and B². And, for the purpose of yieldingly holding the top depressing drum down on the beet tops a spring B³ may be arranged between the frame part 12 and the housing for the shaft 6. This spring may be mounted on a guide rod, as shown, which slides in a clip on the housing for the shaft 6. The rotating knives are intended to be able to cut the surface of the earth as well as the flesh of the beets to fully remove the beet tops and, the raising and lowering means is intended to regulate the position of knives and drum with reference to the earth and the portion of the beet pulp or flesh projecting above the ground to fully sever the beet tops.

After the beets have been topped by the unit B, and as the tractor A proceeds over the row, the digging unit C comes into play. At this point, it may be explained that the pulling or digging unit C and the lifting unit D are all mounted on a drawer bar or frame F of substantially U-shape, or bail-like formation, having the free ends thereof suitably connected or hinged to a fixed part of the tractor as indicated at F' so that said units C, D may be raised or lowered with respect to the ground.

The digging unit C includes pulling elements 20 carried by suspending members 21 pivotally mounted on bracket 22 carried by the drawer bar F, undue rearward motion of the pulling elements being prevented by brace 23. The pitching unit D including disk 24 mounted on shaft 25 journalled as at 25ᵃ in the drawer bar is suitably connected at 27 with the transmission A'. Disk 24 carries pitching forks 26 controlled by guide stems 27 and eyes 28 on disk 29 rotated by shaft 25. These forks pitch the beets to one side of the row where they may be picked up by a conveyor, if desired.

The drawer bar F is provided at opposite sides with suspending arms 41 whose upper ends have a link conection 42 with crank arms 43 of a horizontal adjusting shaft 44 journaled between spaced arms 40. One portion of this shaft carries an operating lever 45 which cooperates with a fixed toothed or equivalent segment 46 mounted on one of the uprights 40. The arms 41 are preferably engaged at their point of pivotal connection with links 42 by the tensioning springs 47 which assume much of the load or weight of the elements C and D. By manipulating lever 45 over the segment 46, the drawer bar F and associated parts may be raised and lowered with reference to the ground to enable the operator to lift these instrumentalities clear of the ground when travelling to and from the beet field.

In operation, it will be understood that the tractor travels over and above the row of beets, the front wheels of the tractor being sufficiently spaced to straddle the row while the rear wheels are also spaced sufficiently far apart to straddle several rows and thus clear the adjacent beet hills. As the tractor moves along, the power driven topping unit B will first cause the tops of the beets to be pressed down due to being engaged by the inflated hollow drum 13 while the rotating knives 14 will shear or cut the tops and leave the body of the beet in the ground. Subsequently, the beets are plowed or pulled from the earth by the pullers 20 and are then thrown out of the row by the pitchforks 26.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In a beet harvester, a beet topping unit including a rotatable foliage depressing member, and power driven cutting knives operating peripherally of the said member for shearing the tops from the body of the beet.

2. In a beet harvester, including a chassis, a source of power, a swinging top-cutting frame pivotally supported at one end to the chassis, means comprising shafting and gearing connected with said source of power, a rolling top depressing member carried by the lower end of the swinging frame, and shearing knives mounted to operate about the periphery of the top depressing member and operatively connected with said shafting and gearing.

3. In a beet harvester, a beet topping unit including an inflated top depressing drum, and shearing means operating in conjunction therewith.

4. In a beet harvester, a beet topping unit including an inflated top depressing drum, and rotatable power driven shearing means operating in conjunction therewith.

5. In a beet harvester, a self adjusting swinging frame, a top depressing member carried at the free end of the frame, shearing means operating in conjunction with said member, and power driven connections carried by said swinging frame for operating the shearing means.

6. In a beet harvester, a power driven shaft serving as a frame support, a frame swingably mounted on said shaft, a top depressing drum idly journalled in the end of the frame opposite the shaft, a knife reel rotatably supported about the drum, and a driving connection between the reel and said power driven shaft.

7. In a beet harvester, a beet topping unit including a compressible top depressing drum, and shearing means operating peripherally about said drum.

8. In a beet harvester, a beet topping unit including a compressible top depressing drum, means for supporting the drum for idle rolling movement, and power driven shearing elements mounted to operate peripherally about said drum.

9. In a beet harvester, a beet topping unit including an annular top depressing member having a yielding surface for depressing the tops of the beets, and shearing means operating in conjunction with said member.

OLE HANSEN.